Jan. 17, 1956   A. D. L. HUTCHINSON   2,731,293
DUMP TRUCKS
Filed June 18, 1951   4 Sheets-Sheet 1

INVENTOR
A. D. L. HUTCHINSON
By Cook & Robinson
ATTORNEYS

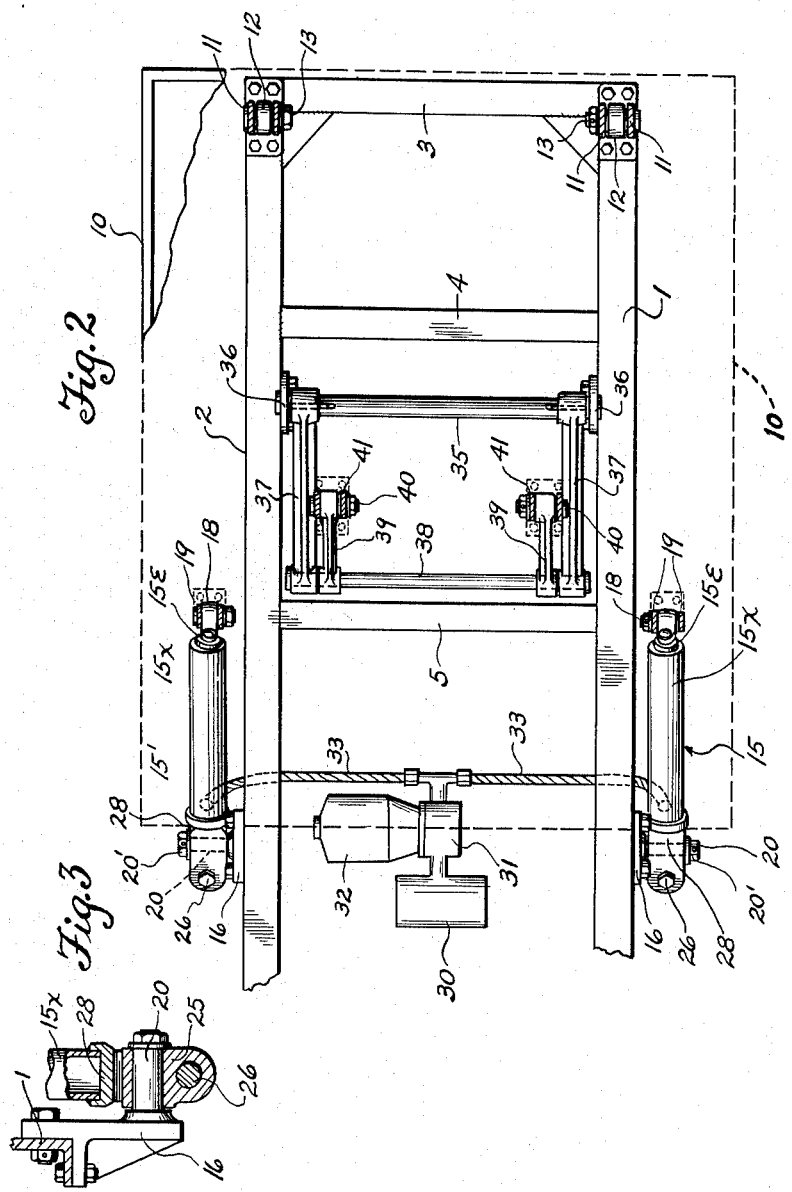

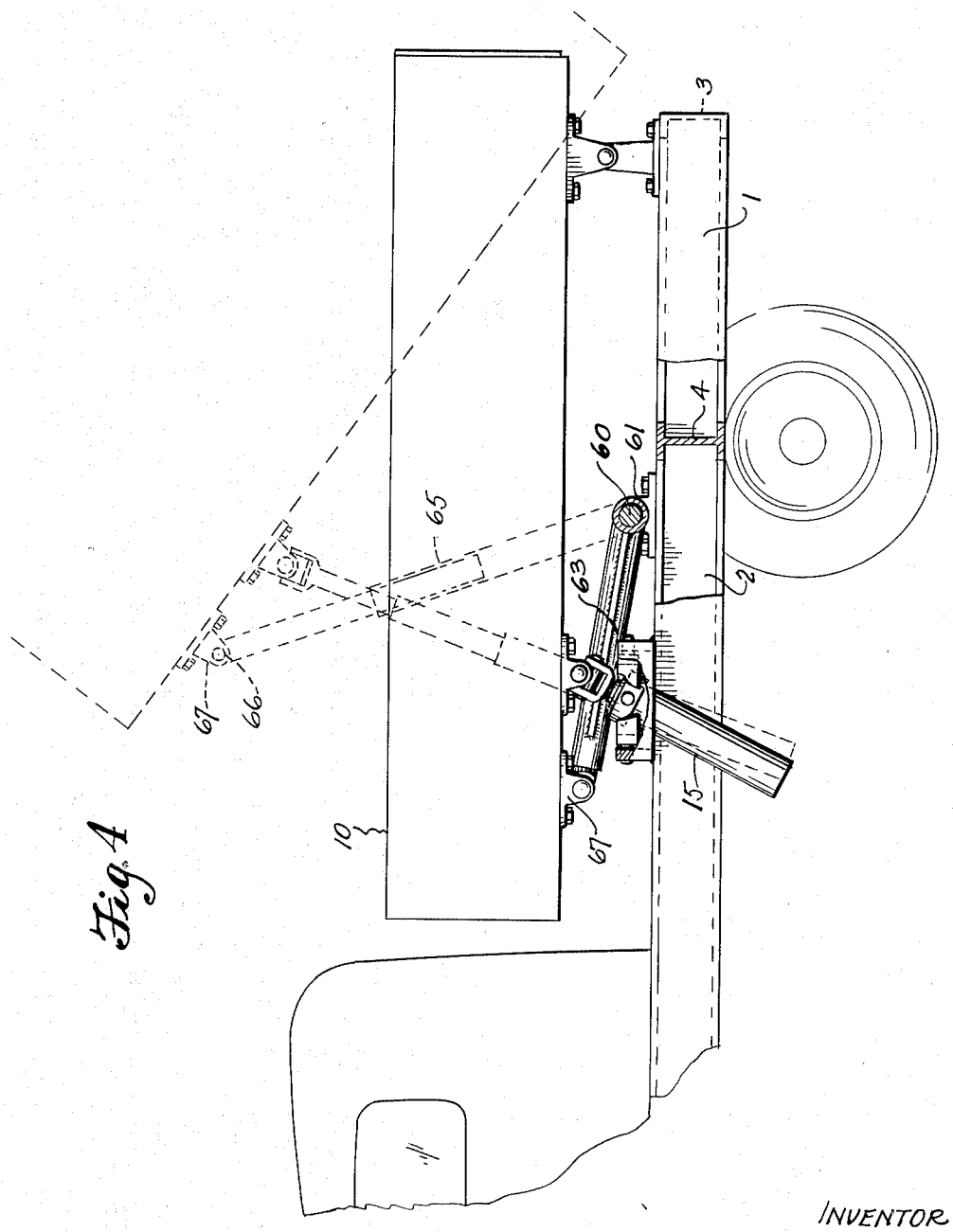

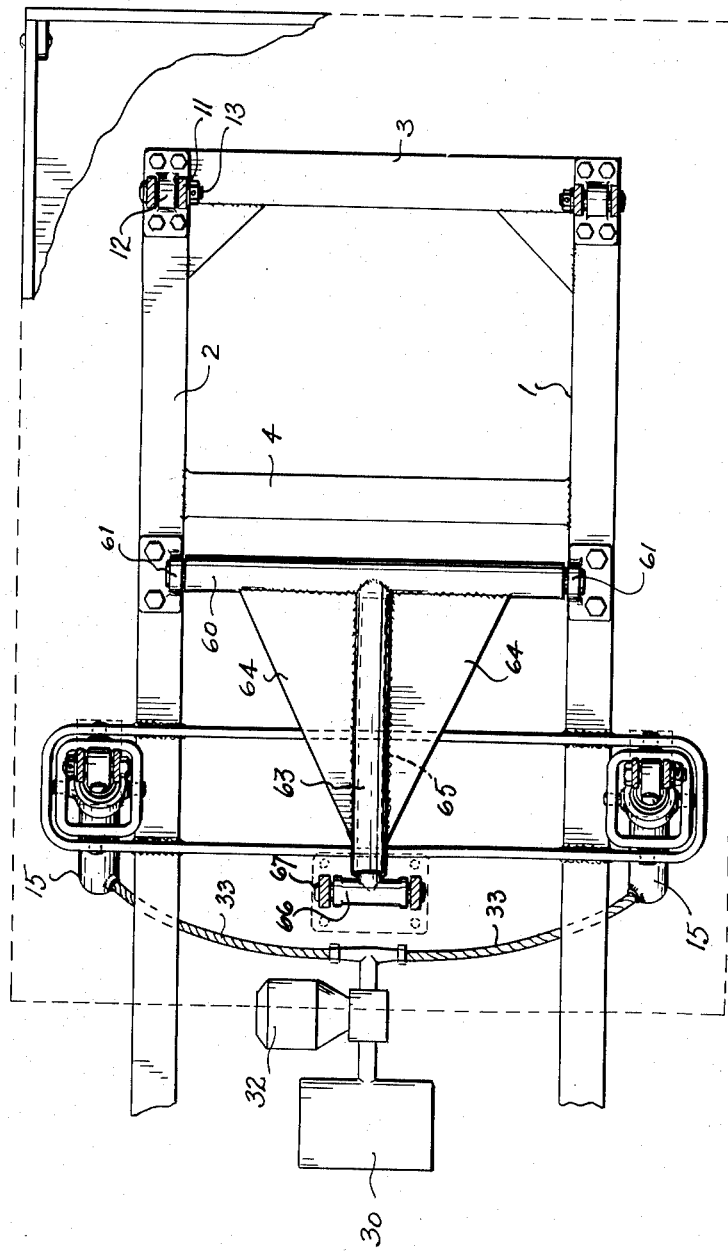

United States Patent Office 2,731,293
Patented Jan. 17, 1956

2,731,293

DUMP TRUCKS

Archibald D. L. Hutchinson, Seattle, Wash.

Application June 18, 1951, Serial No. 232,171

12 Claims. (Cl. 298—22)

This invention relates to dump trucks of those kinds wherein a dump body is hinged at its rear end on the chassis or frame of the vehicle and is adapted to be moved between loading and dumping positions by hydraulic jacks, mounted on the frame and connected directly to the body to apply the lifting forces to its forward end portion. The present application is a continuation-in-part of my application Ser. No. 702,842, filed October 11, 1946, now abandoned.

It is the principal object of this invention to provide improved body guide and bracing means for use in connection with dump trucks that are equipped with single or dual jacks that are directly connected to the dump body and having full oscillating mountings; the said means being designed to guide the body and to brace it, upon its being lifted, and while the truck is traveling, against racking forces that tend to cause it to twist, tilt or turn laterally due to its being more heavily loaded on one side than on the other or by reason of the vehicle traveling on rough or on a laterally sloping surface.

It is also an object of the invention to provide, in a dump truck employing directly connected jacks of the full oscillating type, a novel full cycle brace and guide that is independent of the jacks and which will automatically adjust itself to the raising and lowering movements of the body, thus to maintain its bracing and guiding function at all times, whether the truck is standing or traveling.

Still another object of the invention is to provide a brace and guide mechanism in combination with directly connected hydraulic jacks of full oscillating type, whereby all the advantages of the full oscillating type of jack are retained and the stability of the body relative to the frame is maintained during dumping operations regardless of uneven loading of the body or due to dumping while the truck is traveling on rough ground or is standing on laterally sloping ground.

It is also an object of the invention to overcome certain operational disadvantages in use of dump bodies equipped with jacks that have full oscillating action, by use of a toggle connection between the dump body and vehicle chassis, that not only guides and braces the body against angulation in its raising and lowering movements but which also will cause the weight of the load, as applied to the individual jacks to be equalized regardless of an unbalanced load or the raising of the body while the vehicle is standing or moving on laterally sloping ground surfaces.

Other objects of the invention reside in the combination and relationship of the jacks, and the present guiding and bracing means as used in connecting the truck chassis and dump body.

In accomplishing the above and other objects of the invention, I have provided the improved details of construction, the preferred forms of which are illustrated in the accompanying drawings, wherein—

Fig. 2 is a plan view of the same, with the dump body removed from the chassis for better showing of those parts that are beneath the body.

Fig. 3 is a detail of one of the jack mountings.

Fig. 4 is a side view of a dump truck body equipped with a telescopic brace and guide to sustain the body against lateral angulation.

Fig. 5 is a plan view of the parts seen in Fig. 4.

Figure 1:
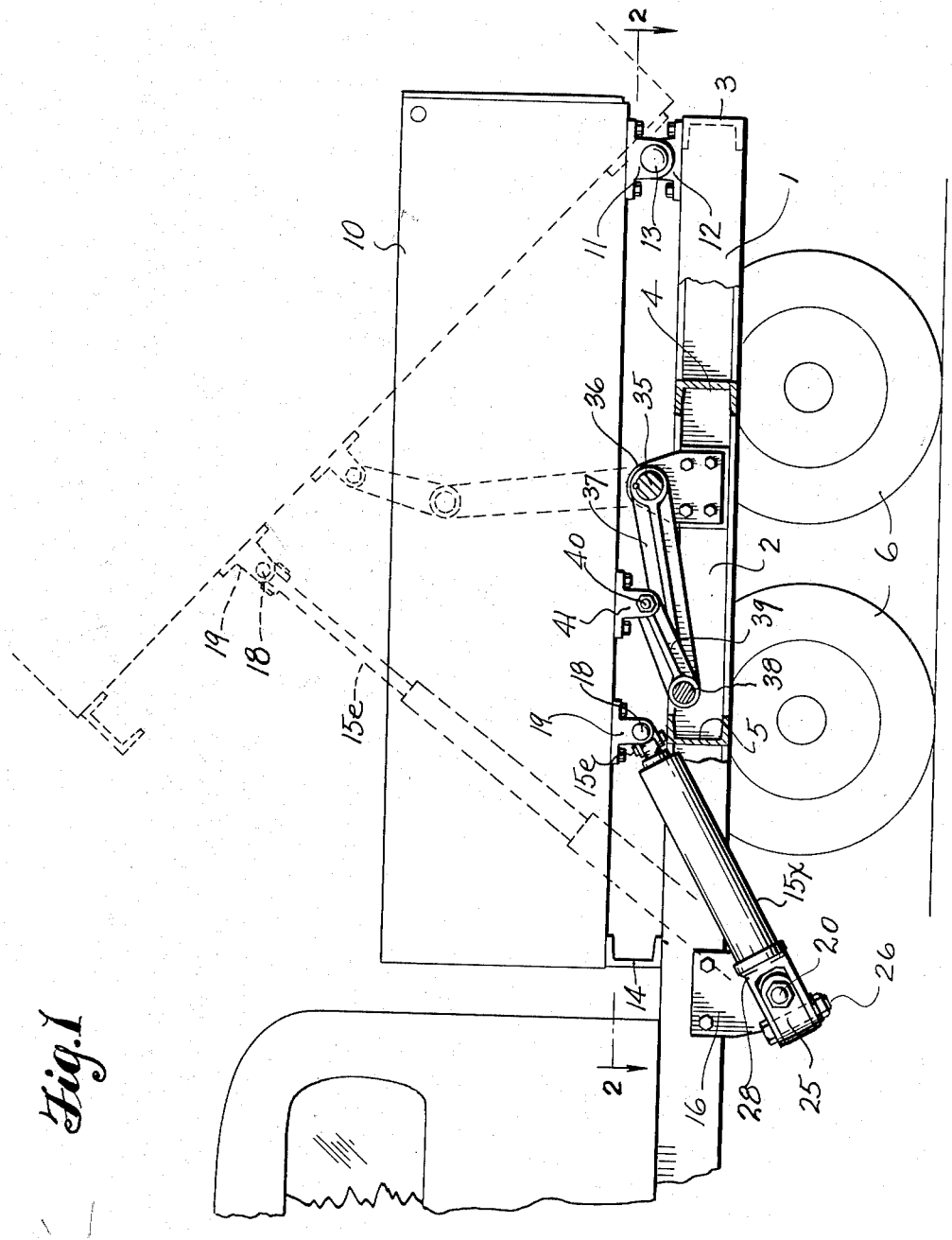
Fig. 1 is a side view of a dump truck equipped with directly connected and full oscillating hydraulic jacks, and with a body bracing and guiding means embodied by the present invention; certain parts being shown in section for better illustration.

Referring more in detail to the drawings—

First, it will be explained, that, heretofore, dump bodies have been mounted on truck frames or chassis in a manner like or similar to the showing herein, and also have heretofore been lifted by directly connected hydraulic jacks arranged centrally of and/or at opposite sides of the vehicle frame, or chassis, and operatively connected with the dump body in various ways. In some installations, hydraulic jacks of the full oscillating type have been used in order to avoid excessive wear on jack mountings and packings. However, to my knowledge, where jacks of the full oscillating types have been used, the body has lacked the lateral bracing effect that is inherent in jacks of the one-way or longitudinally oscillating types. As a result of this absence of bracing, the lateral tilting, angulation, turning, twisting and racking of the dump body, due to uneven loading or by reason of the truck traveling on rough roads or on unlevel or laterally sloping ground, has caused the body mountings to be subjected to heavy wear and the whole unit to be unstable to the point that it is difficult to operate and sometimes results in accidental upsets.

In the present arrangement of novel guides, the bracing advantages residing in use of directly connected, dual jacks has been retained, but the disadvantages, including the wear and strain on the jacks, their mountings, packing glands and associated parts, has been eliminated by reason of the use of mountings for the jacks that provides for full oscillation, both laterally and longitudinally of the body, and the use with the full oscillating jacks of a full cycle body guiding and bracing means, connected with body and frame.

In Figs. 1 and 2, I have illustrated the rear end portion of a dump truck of a common type, comprising a frame or chassis that includes the laterally spaced or opposite side beams 1 and 2, rigidly joined across their rear ends by a beam 3 and joined forwardly thereof by cross-beams 4 and 5. The rear end portion of this chassis, or frame, is mounted in the usual, or in any suitable manner, upon ground wheels here designated by reference numeral 6. It is to be understood that the forward end of the vehicle frame would be equipped with the usual steering and supporting wheels.

The dump body is designated by reference numeral 10 and it is here shown to be of rectangular form and equipped at the under side and at its rear end with laterally spaced bearings 11—11 coacting with hinge ears 12—12 on the frame beams to receive pivot bolts 13—13 therethrough whereby the dump body is hingedly fixed upon the rear end of the chassis for rearward dumping of the load as is indicated by the dotted line position of the body in Fig. 2. Fixed to the under side of the dump body, across its forward end, is a cross beam 14 and this is designed to rest upon the longitudinal beams 1 and 2 when the dump body is in lowered position.

For the controlled raising and lowering of the dump body, I have equipped the truck with two hydraulic jacks, 15 and 15′ here shown to be of the telescopic type. Each jack cylinder 15x is mounted by a bracket 16 that is fixed to the corresponding side beam of the vehicle chassis and the mounting is such as to permit the cylinder to oscillate both laterally and longitudinally of the vehicle, as will presently be more fully explained, this being designated as a "full oscillating" jack.

Each jack comprises extendable piston portions 15e and these have pivoted connections at their outer ends, as at 18, to laterally spaced lugs or brackets 19—19 fixed on the dump body at its under side; the connections being such that by extending the piston portions of the jacks and by retracting them, the body will be raised and lowered between its full line position and the dotted line position in Fig. 1. This manner of operatively connecting the jacks with the body is designated as a direct connection as distinguished from those connections which are made through levers or linkage of various kinds.

In order that the jack mountings and the various parts, such as the connections, packing glands and telescopically fitted parts, may be relieved of detrimental or abnormal strain and undue wear that results from the racking of the body, or the tendency of the body to tilt, twist or swing laterally on the frame if raised while unevenly loaded or while the vehicle is traveling or operating on laterally sloping ground, or which results from the inherent resiliency in the frame structure, I have mounted each jack cylinder 15x in a manner to permit its full oscillation; that is, for oscillation laterally of the frame as well as longitudinally thereof. This might be accomplished in various ways, for example by using rubber bushings in the mountings. However, the present preferred means for so mounting each of the jacks, as here shown, comprises a horizontal axle or stub shaft 20 that extends directly outward from the jack supporting bracket 16; the brackets, as shown, being bolted or otherwise secured to the frame beams, or mounted as later described in connection with the device of Fig. 4. In Fig. 2 I have shown the axles 20—20 at opposite sides of the frame to be outside the longitudinal lines of the chassis and also in coaxial alignment.

Revolubly mounted on each axle 20 is a collar or hub 25, held on the axle by a nut 20′, and each collar has a pivot bolt 26 extended therethrough, below the axle 20, on the opposite ends of which the downwardly directed leg portions of a U-shaped base member 28 for the corresponding jack are pivotally mounted. The jack cylinder 15x is mounted rigidly in or upon the base member, and by reason of the rotatable mounting of the collar on the stub axle, the jack cylinder can oscillate in the longitudinal direction of the frame, and by reason of the pivoting of the jack base member 28 on the bolt 26, the cylinder can also oscillate laterally of the frame. It will be understood then, that by reason of this full oscillation of the jacks, any lateral swinging, tilting, twisting or angulation of the body relative to the frame or chassis that results when the loaded body is raised for dumping, will not cause any binding of telescopic parts of the jacks, and no damage or excessive wear from this will result.

The two hydraulic jacks may be conjointly controlled by any well known hydraulic system. In the present drawings, in Fig. 2, I have indicated a source of hydraulic pressure medium at 30, a pump at 31, power device at 32 and flexible conduits 33—33 extended to the lower ends of the jack cylinders from the pump for the application of the hydraulic medium, at equal pressures to the two jacks.

It will be understood that if the body is raised for dumping a load while the truck is operating on laterally sloping ground, or if one of the rear wheels is in a depression, there will be a tendency for the body, as it is being raised, to swing to one side. This movement of the body from alignment with the chassis, I will refer to as "angulation." This angulation increases with the raising of the load and not only places the mounting parts under heavy strain but may even result in an upset. If the truck body, especially while in any raised position, can be retained in the longitudinal plane of the vehicle chassis on which it is mounted, then the disadvantages that result from angulation or upset can be eliminated. To accomplish this, I have provided as one embodiment of the invention, a body bracing guide mechanism of toggle type, providing a connection between dump body and chassis. This mechanism comprises a horizontal cross shaft 35 that is rotatably supported in bearings 36—36 that are fixed to the longitudinal beams at opposite sides of the chassis substantially ahead of the hinge axis of the dump body. Fixed rigidly to the cross shaft, adjacent its opposite end bearings, are paired lever arms 37—37 of equal length and these extend forwardly in parallel relationship, and at their outer ends are rotatably mounted on a cross-shaft 38 therein parallel with shaft 35. Welded to the ends of this cross-shaft 38 are lever arms 39 which, at their outer ends are pivotally attached by bolts 40 to brackets 41 fixed to the under side of the dump body. The arms 37—37 and arms 39—39 of the two sets are of the same length and the brackets 41 are in transverse alignment. Thus, with the raising of the body, any tendency for it to lean or twist to one side, or become out of alignment with the direction of the chassis, will be prevented by reason of the toggle linkage. It is to be understood that while I have here shown use of two toggles, the same results, in so far as bracing and guiding the body is concerned, can be accomplished by use of one set if arranged to pivot on axes that are parallel to the body hinge axis. However, there is an additional advantage in the use of two toggles arranged to act in unison, since in the present use of the dual, full oscillating jacks should there be a tendency of one, by reason of unequal loading of the body, or by reason of the body leaning, to run ahead of the other and thus further aggravate the condition, the laterally spaced sets of toggle levers, as connected through shafts 35 and 38, will effect an equalization of load on the two jacks. This equalization is by reason of the fact that with the tendency of one jack to run ahead of the other, the equalizing leverage at that side applies a rotative force to the cross shaft 35 that is transmitted therethrough to the leverage of the toggle at the other side to supplement the lifting action of the jack at that side. As a result, regardless of the unequal application of lifting forces as individually applied by the jacks, the toggle leverage effects an equalization in application as between the dump body and vehicle frame and the tendency of the body to "angulate," that is, twist or swing laterally is overcome.

It is to be explained that the invention is not confined to the present telescopic type of jack here shown, but may employ any of the present day jacks of full oscillating character and the manner of mounting the jacks may be as illustrated or by means of any suitable mounting that permits the required lateral oscillation as well as the longitudinal oscillation of the jacks on their supports.

The body guiding and lifting equalizing leverage is very desirable and practical for load equalizing purposes regardless of the type of jack used or location of jacks as it serves to hold the body in alignment with the frame in any dumping action.

In Figs. 4 and 5, I have shown a truck that is equipped with lifting jacks, as in the showing of Figs. 1 to 3, and operated substantially in the same way to raise and lower the body but which is equipped, as another embodiment of the invention, with a full cycle guide of a telescopic nature designed to resist leaning or tendency of the body to twist to one side or the other. The brace comprises a cross-shaft 60 that is pivotally supported at its ends in bearings 61—61 that are fixed on the frame beams 1 and 2. Mounted on the shaft 60, perpendicular thereto, and centrally of the frame, is a cylindrical guide 63 laterally braced by the webs 64—64. Telescopically fitted in this cylindrical guide is a shaft 65 which at its outer end has a cross head 66 that is hingedly attached to ears 67 on the bottom of the dump body. The hinge axis of the telescopic brace are parallel to the body hinge axis. With the raising of the dump body, the shaft is extended, but at all positions is held rigidly against any lateral movement, thus to sustain the forces or lateral strains that may result from unequal loading or due to operation on laterally sloping ground.

In this latter construction, as well as in the body guiding and equalizing toggles previously described, the guide devices are hinged to the chassis, substantially forwardly of the body hinge and therefore there is the additional advantage that in the event one rear wheel might be in a hole, the front end of the body, by being guided in its up and down travel, follows more closely the longitudinal plate of the chassis at this point of connection of the guide than in the plane at the location of the rear wheels.

While in the present illustrations, I have disclosed use of dual jacks of full oscillating type, it is possible and practical in some installations to employ a centrally located, single jack for the raising of the body; the gist of the present invention residing in the use with one or more directly connected jacks of the full oscillating type, of a body guide and brace whereby the tendency of the body, from any cause, to swing laterally of the longitudinal plane of the chassis is resisted or prevented. Both the devices of Fig. 1 and Fig. 4 accomplish this purpose, and the device of Fig. 1 serves additionally as a load equalizing means.

One of the greatest advantages in the use of the present types of body guides and braces resides in the fact that they make possible the travel of the truck over rough and uneven road surfaces with the body in fully raised position, and protect the body mountings and frame structure against the usual rocking forces that are incident to such travel. The fact that the truck can be used under such road conditions and with the body raised, makes it possible to speed up dumping operations, yet without subjecting the body mountings, or chassis mountings to unusual stress or strains. Rocking strains are eliminated and the likehood of upset from this cause is eliminated.

Having thus described my invention, what I claim as new therein and desire to secure by Letters Patent, is:

1. In a dump truck having a chassis, a dump body hingedly mounted thereon for rear end dumping and dual, full oscillating jacks mounted on the chassis at opposite sides and directly connected with the body at opposite sides and conjointly operable to effect its dumping action; a bracing and guiding means comprising toggle linkage having inner and outer end members hingedly joined to turn about an axis that is parallel to the hinge axis of the dump body, and hinged at their outer ends to turn on axes that are parallel to the hinge axis of the body and mounted, respectively, in the chassis and dump body substantially forward of the body hinge axis; said toggle linkage having the function of guiding the body in its raising and lowering movements and to brace it against lateral angulation relative to the longitudinal line of the chassis.

2. A dump truck comprising a chassis, a dump body hingedly mounted thereon, dual jacks operating conjointly for lifting the body from loading to dumping position, and supported from the chassis at a distance spaced from the hinge axis and connected to the body at opposite sides, and paired, coacting laterally spaced toggles mounted on the chassis and operatively connected with the body at opposite sides, and toggle coordinating means connecting the sets of toggle levers for action in unison and through which the body load, as sustained by the individual jacks will be equalized.

3. A dump truck comprising a chassis, a dump body hingedly mounted thereon, a pair of jacks operating conjointly for lifting the body from loading to dumping position, and supported from opposite sides of the chassis at a distance spaced from the hinge axis and connected to the body at opposite sides, and paired toggles mounted on the chassis at opposite sides and operatively connected with the body at opposite sides and through which the body load as sustained by the individual jacks will be equalized, said toggles comprising toggle linkage hingedly connected with the chassis and body at opposite sides and at intervals spaced from the body hinged axis, and the linkage of the toggles being interconnected to operate in unison to sustain the body against unbalanced lateral forces.

4. A dump truck comprising a chassis, a dump body hingedly mounted thereon for end dumping, a pair of hydraulic jacks operable conjointly for lifting the dump body from loading to dumping position, supported from the chassis at opposite sides thereof for longitudinal and transverse oscillation, and having lifting connection with the body at its opposite sides, and load equalizing linkage, comprising a cross-shaft revolubly mounted by the chassis and spaced from the hinge axis, laterally spaced sets of toggle levers fixed on the cross shaft and pivotally connected to the dump body at opposite sides and through which links and shaft the weight of the load as sustained by the jacks at opposite sides of the dump body will be equalized.

5. A dump truck comprising a chassis, a dump body hingedly mounted thereon for end dumping, a pair of hydraulic jacks operable conjointly for lifting the dump body from loading to dumping position, supported from the chassis at opposite sides thereof for longitudinal and transverse oscillation, and having lifting connection with the body at its opposite sides, and load equalizing linkage, comprising a cross-shaft revolubly mounted by the chassis and spaced from the hinge axis, laterally spaced sets of toggle levers fixed on the cross shaft, a second cross-shaft mounted by the swinging ends of said toggle levers, parallel with the first cross-shaft lever arms fixed to the end portions of the second cross-shaft and pivoted at their outer ends to the dump body at transversely aligned points.

6. A dump truck comprising a chassis, a dump body hingedly mounted thereon for rear end dumping, a pair of laterally spaced jacks conjointly operable for moving the body from loading to dumping positions; said jacks comprising interconnected hydraulic cylinders supported from the chassis forwardly of the hinge axis for full oscillation and piston members extended therefrom and pivotally connected with the body at laterally spaced points, a cross shaft rotatably mounted by the chassis spaced from the body hinge axis and laterally spaced sets of toggle links fixed to the shaft and having their outer ends pivotally attached to the body at laterally spaced points forward of its hinge axis and through which the body load will be equalized in its relationship to the individual jacks.

7. A dump truck comprising a chassis having opposite side beams, a dump body hingedly supported on the chassis for rear end dumping, a pair of hydraulic jacks supported, respectively, from the opposite side beams of the chassis beneath the forward end of the body; each jack having a full oscillating support from its beam and pivotally connected to the body at the corresponding side thereof, means for applying a hydraulic pressure medium to the jacks for their conjoint action for lifting the body to dumping position, a cross shaft revolubly supported by the opposite side beams of the chassis forward of the body hinge, a pair of parallel lever arms fixed to the shaft at opposite sides of the chassis, a cross-shaft revolubly mounted by the outer ends of said lever arms, with levers fixed to the outer end portions of the second cross-shaft, with outer ends pivoted to the opposite sides of the dump body, whereby the body load in its relationship to the jacks will be equalized and unbalanced lateral forces sustained.

8. The combination of a dump truck having a chassis, a dump body hinged thereon, full oscillating means for lifting the body from loading to dumping positions and an equalizing and body guiding toggle linkage secured at one end to the chassis and at its other end to the dump body, said linkage comprising a cross-shaft revolubly mounted by the chassis at a distance spaced from and parallel to the hinge axis, toggle links fixed at one end on the cross-shaft and pivotally connected at their other end to the dump body at opposite sides thereof and at a substantial distance from the hinge axis.

9. In a dump truck having a chassis, a dump body hingedly mounted thereon solely for rear end dumping, hydraulic cylinder power means mounted on the chassis forwardly of the transverse center line of the body and interconnected with the body intermediately of the transverse center line and the mounting on the chassis for effecting its dumping action, the end connections for the hydraulic cylinder means being such as to permit oscillation in a vertical as well as a lateral direction, vertically extensible guiding means carried by the chassis at a first, fixed pivotal axis rearwardly of the connections of the power means with the body and connected with the body at a second, fixed pivotal axis forwardly of said first fixed axis, a portion of the guiding means extending transversely of the chassis and maintained in a rotatable relation to the chassis, the disposition of the fixed pivotal connections of the power means between the chassis and the body and the fixed pivotal connections of the guiding means between the chassis and the body serving to minimize objectionable stresses and strains and resistance to upwardly lifting of the body, whereby when the body is being raised by the hydraulic cylinder means, the guiding means will simultaneously extend and substantially maintain the longitudinal axis of the body in a fixed plane perpendicularly related to said portion of the guiding means, and simultaneously with the raising and lowering of the body, said end connections of the hydraulic cylinder means allowing for any angulation of the body relative to the chassis and thus preventing any undue strain from being imparted to the hydraulic cylinder means.

10. The combination according to claim 9 wherein the second fixed pivotal axis is located adjacent the body end remote from the hinge mounting of the body on the chassis.

11. The combination according to claim 9 wherein the guiding means includes upper and lower telescopically associated elements.

12. The combination according to claim 11 wherein the lower telescopic element is comprised of a sleeve, the lower end of which is fixedly secured to said transverse portion of the guiding means, and substantially triangularly shaped, rigidifying webs joining said sleeve and said transverse portion for maintaining said sleeve in fixed relation to said transverse portion.

References Cited in the file of this patent

UNITED STATES PATENTS

| | | |
|---|---|---|
| 1,152,510 | Hunt | Sept. 7, 1915 |
| 1,584,645 | Prosser | May 11, 1926 |
| 1,608,959 | Raddatz | Nov. 30, 1926 |
| 1,765,232 | Hug | June 17, 1930 |
| 1,925,296 | Barrett | Sept. 5, 1933 |
| 1,944,414 | Eisenberg | Jan. 23, 1934 |
| 2,034,544 | Wood | Mar. 17, 1936 |
| 2,326,594 | Wood | Aug. 10, 1943 |
| 2,510,814 | Golay | June 6, 1950 |
| 2,635,004 | Shadwick | Apr. 14, 1953 |

FOREIGN PATENTS

| | | |
|---|---|---|
| 4,374 | Great Britain | Feb. 20, 1913 |
| 61,296 | Norway | Aug. 14, 1939 |
| 476,402 | Great Britain | Dec. 8, 1937 |
| 763,271 | France | Feb. 12, 1934 |
| 788,966 | France | Aug. 5, 1935 |